(12) United States Patent
Matsushita et al.

(10) Patent No.: US 10,999,186 B2
(45) Date of Patent: May 4, 2021

(54) TRANSFER DEVICE AND ROUTE ADDITION METHOD

(71) Applicant: Mitsubishi Electric Corporation, Tokyo (JP)

(72) Inventors: Ryuma Matsushita, Tokyo (JP); Yoshifumi Hotta, Tokyo (JP); Ryusuke Kawate, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/346,624

(22) PCT Filed: Jan. 4, 2017

(86) PCT No.: PCT/JP2017/000031
§ 371 (c)(1),
(2) Date: May 1, 2019

(87) PCT Pub. No.: WO2018/127943
PCT Pub. Date: Jul. 12, 2018

(65) Prior Publication Data
US 2019/0319877 A1    Oct. 17, 2019

(51) Int. Cl.
*H04L 12/703* (2013.01)
*H04L 12/751* (2013.01)
(Continued)

(52) U.S. Cl.
CPC .............. *H04L 45/28* (2013.01); *H04L 45/02* (2013.01); *H04L 45/12* (2013.01); *H04L 45/22* (2013.01); *H04L 45/24* (2013.01); *H04W 84/18* (2013.01)

(58) Field of Classification Search
CPC ......... H04L 45/28; H04L 45/02; H04L 45/12; H04L 45/22; H04L 45/24; H04L 45/38; H04L 45/48
See application file for complete search history.

(56) References Cited

U.S. PATENT DOCUMENTS

| 6,115,753 A * | 9/2000 | Joens ...................... H04L 45/04 370/256 |
| 2006/0087965 A1* | 4/2006 | Shand ..................... H04L 45/22 370/218 |

(Continued)

FOREIGN PATENT DOCUMENTS

CN     105490935 A    4/2016

OTHER PUBLICATIONS

"IEEE Standard for Local and metropolitan area networks—Media Access Control (MAC) Bridges and Virtual Bridged Local Area Networks—Amendment 20: Shortest Path Bridging", IEEE Std 802.1aq—2012, Jun. 29, 2012, 340 pages.

(Continued)

*Primary Examiner* — Faruk Hamza
*Assistant Examiner* — Abusayeed M Haque
(74) *Attorney, Agent, or Firm* — Birch, Stewart, Kolasch & Birch, LLP

(57) ABSTRACT

Provided are a redundant route calculator that calculates, on the basis of first topology information on a network made up of a plurality of transfer devices, a plurality of shortest routes from a first transfer device to a second transfer device among the plurality of transfer devices, and generates redundant route information; a forwarding database that stores the redundant route information; and a single point-of-failure detector that detects a single point of failure on the basis of the redundant route information and generates second topology information obtained by removing the single point of failure from the first topology information. On the basis of the second topology information, the redundant route calculator calculates an additional route candidate from the first transfer device to the second transfer device. The single point-of-failure detector decides the additional route to register in the forwarding database.

9 Claims, 6 Drawing Sheets

(51) Int. Cl.
  *H04L 12/721*   (2013.01)
  *H04L 12/707*   (2013.01)
  *H04W 84/18*    (2009.01)

(56) References Cited

U.S. PATENT DOCUMENTS

| | | | |
|---|---|---|---|
| 2008/0151755 A1* | 6/2008 | Nishioka | H04L 45/02 370/235 |
| 2009/0213725 A1* | 8/2009 | Kibel | H04L 12/66 370/216 |
| 2012/0063465 A1 | 3/2012 | Keesara et al. | |
| 2013/0080602 A1 | 3/2013 | Keesara et al. | |
| 2013/0336107 A1* | 12/2013 | Vasseur | H04L 41/0654 370/218 |
| 2015/0117203 A1* | 4/2015 | Filsfils | H04L 12/4633 370/235 |
| 2016/0191370 A1* | 6/2016 | Wood | H04L 41/12 370/238 |
| 2017/0331722 A1* | 11/2017 | Greenbaum | H04L 45/12 |
| 2018/0097725 A1* | 4/2018 | Wood | H04L 45/42 |

OTHER PUBLICATIONS

Office Action issued in Taiwanese Patent Application No. 106115588, dated Jun. 26, 2018.
Office Action dated Jan. 28, 2021 in corresponding Chinese Application No. 201780081376.1.

* cited by examiner

TRANSFER DEVICE AND ROUTE ADDITION METHOD

FIELD

The present invention relates to a transfer device and a route addition method that transfer a frame in a mesh network.

BACKGROUND

There is a mesh network as one of network configurations. In the mesh network, redundancy of communication routes, that is, paths are easily implemented by adopting a form in which respective communication devices are interconnected like a mesh. Shortest path bridging (SPB) is a protocol that implements control of redundant paths in the mesh network (Non Patent Literature 1). The SPB is a technology that configures an equal cost multi-path (ECMP) to enable high-speed path switching at the occurrence of a failure, redundant path configuration, traffic distribution, and the like.

CITATION LIST

Non Patent Literature

Non Patent Literature 1: Institute of Electrical and Electronics Engineers (IEEE) Std 802.1aq-2012

SUMMARY

Technical Problem

However, according to the conventional technology mentioned above, in the mesh network, a plurality of paths can be set between two communication devices to achieve redundancy, but a single point of failure (SPOF) is sometimes formed on the set redundant path. There is a difficulty that communication between the two communication devices is interrupted in spite of a redundant path being set therebetween when a failure occurs in the communication device or the communication passage corresponding to the SPOF.

The present invention has been made in view of the above situation and has as its object to obtain a transfer device capable of improving the reliability of communication in a mesh network.

Solution to Problem

In order to solve the above problems and attain the object, the transfer device of the present invention includes: a redundant route calculator that, on the basis of first topology information that is topology information on a network made up of a plurality of transfer devices, calculates a plurality of shortest routes from a first transfer device to a second transfer device among the plurality of transfer devices, and generates redundant route information that is information on the plurality of shortest routes; an information storage that stores the redundant route information; and a single point-of-failure detector that detects a single point of failure on the basis of the redundant route information and generates second topology information that is topology information obtained by removing the single point of failure from the first topology information. On the basis of the second topology information, the redundant route calculator calculates a candidate of an additional route to be added as a route from the first transfer device to the second transfer device, and generates additional route candidate information that is information on the candidate of the additional route. The single point-of-failure detector decides the additional route on the basis of the additional route candidate information, and generates additional route information that is information on the additional route, to register the generated additional route information in the information storage.

Advantageous Effects of Invention

The transfer device according to the present invention has the effect of being able to improve the reliability of communication in a mesh network.

DESCRIPTION OF EMBODIMENTS

Hereinafter, a transfer device and a route addition method according to embodiments of the present invention will be described in detail with reference to the drawings. Note that this invention is not limited by these embodiments.

Embodiment

Figure 1:
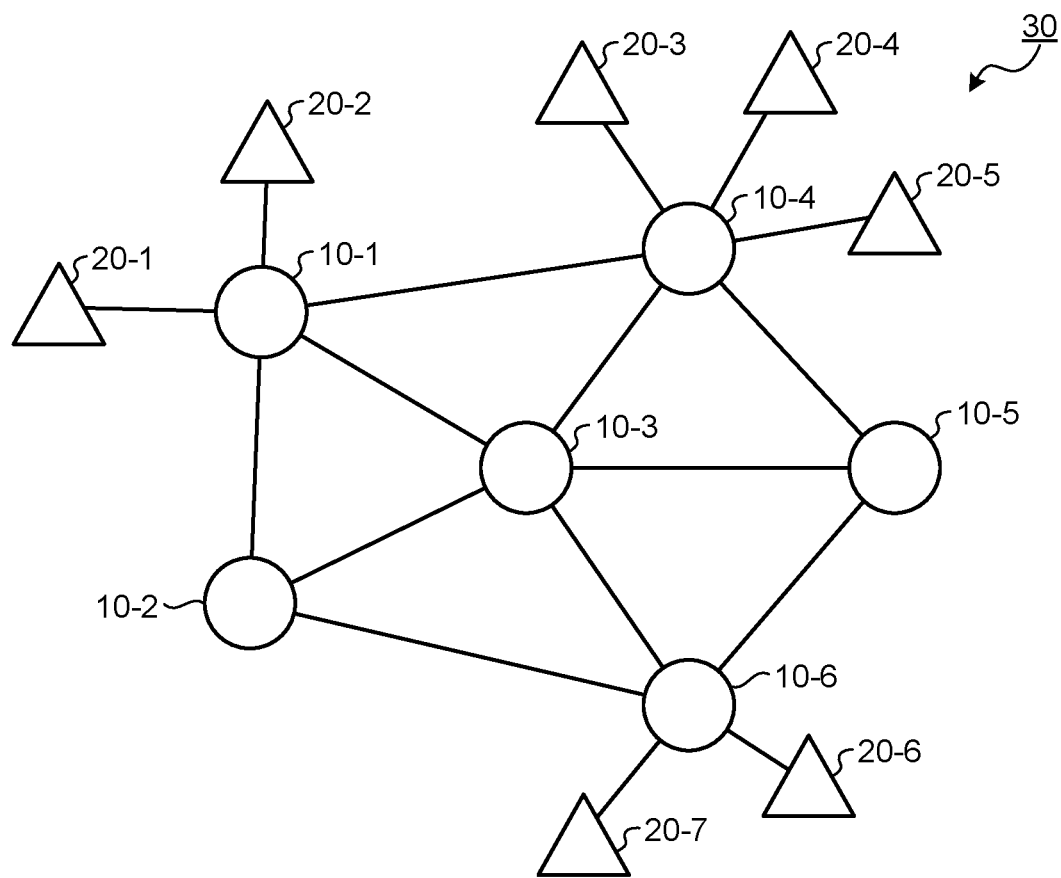
FIG. 1 is a diagram illustrating a configuration example of a mesh network.

FIG. 1 is a diagram illustrating a configuration example of a mesh network 30 according to an embodiment of the present invention. The mesh network 30 is a network made up of transfer devices 10-1 to 10-6 that transfer frames. In addition, terminal devices 20-1 to 20-7 to serve as a transmission source of a frame or a destination of a frame are connected to the mesh network 30. In the following description, when the transfer devices 10-1 to 10-6 are not distinguished, the transfer devices 10-1 to 10-6 are referred to as transfer devices 10 in some cases. Likewise, when the terminal devices 20-1 to 20-7 are not distinguished, the terminal devices 20-1 to 20-7 are referred to as terminal devices 20 in some cases.

The transfer device 10 is a switch device that can be connected to one or more other transfer devices 10 and one or more terminal devices 20. Each transfer device 10 exchanges connection information with another transfer device 10 constituting the mesh network 30 and generates topology information on the mesh network 30 from connection information collected from the other transfer devices 10 to store. The connection information is information about the transfer device 10 to which another transfer device 10 is connected. The topology information on the mesh network 30 is taken as first topology information. In addition, each transfer device 10 decides a communication route leading to each of the other transfer devices 10, that is, the route for communicating with each of the other transfer devices 10, by SPB. In the following description, the route is referred to as a path in some cases.

The terminal device 20 is connectable to one transfer device 10. The terminal device 20 communicates with, that is, transmits and receives frames to and from another terminal device 20 via one or more transfer devices 10. In FIG. 1, the connection relationship between each transfer device 10 and each terminal device 20 is indicated by a solid line and the solid line represents a communication passage as well. In the following description, the communication passage between adjacent transfer devices 10 is referred to as a link in some cases.

Figure 2:
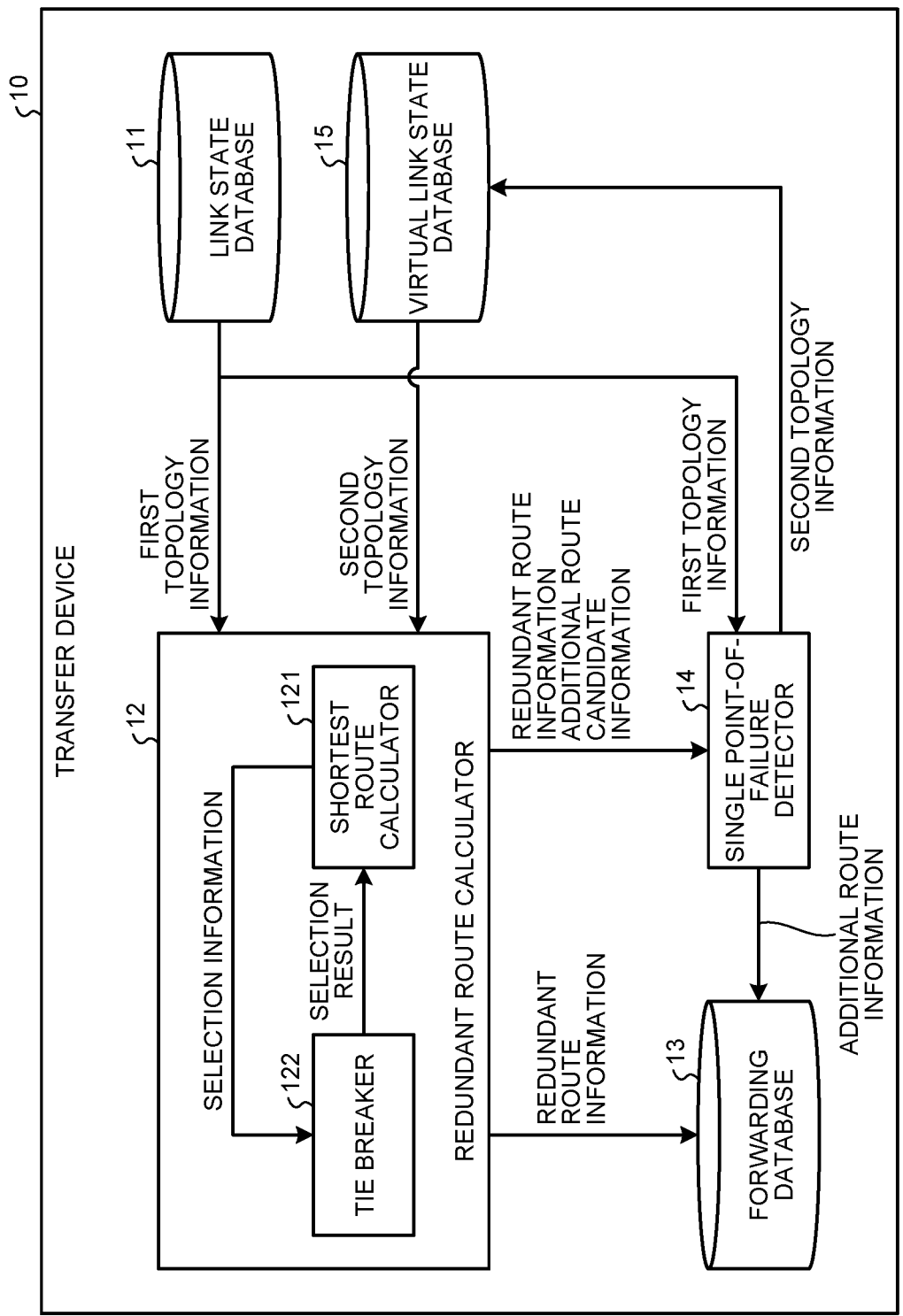
FIG. 2 is a block diagram illustrating a configuration example of a transfer device.

The configuration of the transfer device 10 will be described. FIG. 2 is a block diagram illustrating a configuration example of the transfer device 10 according to the present embodiment. The transfer device 10 includes a link state database 11, a redundant route calculator 2, a forwarding database 13, a single point-of-failure detector 14, and a virtual link state database 15. The redundant route calculator 12 includes a shortest route calculator 121 and a tie breaker 122. Note that FIG. 2 depicts the main part of the transfer device 10 related to the characteristic operation of the present embodiment, specifically, functional blocks necessary for setting the route for communicating with another transfer device 10, and illustration of other functional blocks included in the general transfer device is omitted in FIG. 2.

The link state database 11 is a first information storage. The link state database 11 stores the first topology information, which is topology information on the mesh network 30 made up of the plurality of transfer devices 10. The first topology information includes information on the connection relationship between the transfer devices 10 and a link cost. The link cost is, for example, the bandwidth of each link.

On the basis of the first topology information held by the link state database 11, the redundant route calculator 12 calculates one or more shortest paths, that is, shortest routes for every combination of pair of the plurality of transfer devices 10 constituting the mesh network 30. The redundant route calculator 12 uses the SPB when calculating the shortest route. In the redundant route calculator 12, the SPB is implemented by operations of the shortest route calculator 121 and the tie breaker 122. Note that, in the case of the combination of the transfer devices 10 adjacent to each other in the mesh network 30, the combination of the adjacent transfer devices 10 has a single shortest route.

On the basis of the first topology information held by the link state database 11, the shortest route calculator 121 of the redundant route calculator 12 calculates the shortest route between each pair of the transfer devices 10, with respect to all the possible combinations of pairs of the plurality of transfer devices 10 constituting the mesh network 30. For example, the shortest route calculator 121 uses, as an algorithm for calculating the shortest route, the Dijkstra's Algorithm described in "A Note on Two Problems in Connexion with Graphs ("Numerische Mathematik" Volume 1, 1959, p. 269-271)". The shortest route calculator 121 notifies the tie breaker 122 of selection information, which is information on the link cost of each route calculated for each pair of the transfer devices 10, and the like.

In each pair of the transfer devices 10, when there is a plurality of shortest routes from the transfer device 10 at the start point to the transfer device 10 at the end point, the tie breaker 122 of the redundant route calculator 12 selects one of the plurality of shortest routes by a tie-breaking algorithm, on the basis of the selection information from the shortest route calculator 121. The transfer device 10 at the start point is referred to as a first transfer device and the transfer device 10 at the end point is referred to as a second transfer device in some cases. The tie breaker 122 notifies the shortest route calculator 121 of the selection result.

On the basis of the selection result from the tie breaker 122, the shortest route calculator 121 generates redundant route information, which is information on the shortest route, and registers the generated redundant route information in the forwarding database 13. For example, when there is a plurality of shortest routes, the shortest route calculator 121 generates the redundant route information on the shortest route selected by the tie breaker 122 as one piece of the redundant route information. Note that, for convenience of explanation, even if only one shortest route is obtained as a result of calculation by the redundant route calculator 12, information on the shortest route to be registered in the forwarding database 13 by the shortest route calculator 121 and information on the shortest route to be output to the single point-of-failure detector 14 by the shortest route calculator 121 are regarded as the redundant route information. Details of the redundant route calculation procedure by the shortest route calculator 121 and the tie breaker 122 of the redundant route calculator 12 are described in Non Patent Literature 1.

The forwarding database 13 is a second information storage. The forwarding database 13 is a database generally equipped in a device having a frame transfer function and corresponds to, for example, a virtual local area network (VLAN) table. The forwarding database 13 stores the redundant route information, which is information on a plurality of shortest routes calculated by the redundant route calculator 12 and stores information indicating which adjacent transfer device 10 the frame received by the transfer device 10 should be transferred to. The forwarding database 13 is simply referred to as an information storage in some cases.

On the basis of the redundant route information calculated by the redundant route calculator 12, the single point-of-failure detector 14 determines whether there is a transfer device 10 or a link serving as a single point of failure on the route between two transfer devices 10. The single point of failure means a place where, although there is a plurality of shortest routes indicated by the redundant route information, if a failure occurs in a certain transfer device 10 or a certain link, a failure occurs in all the shortest routes and consequently a communication failure is brought about between the pair of transfer devices 10 according to the redundant route information. There are both possibilities that the transfer device 10 is applicable and the link is applicable as a single point of failure. When a single point of failure has been detected, that is, when there is a single point of failure, the single point-of-failure detector 14 generates the second topology information, which is the topology information obtained by removing the single point of failure from the first topology information held in the link state database 11, that is, topology information about a network obtained by removing the transfer device 10 or the link serving as the single point of failure from the mesh network 30, and registers the generated second topology information in the virtual link state database 15. In this manner, the single point-of-failure detector 14 generates the second topology information on the basis of the redundant route information and the first topology information. Details of the operation of the single point-of-failure detector 14 will be described later.

The virtual link state database 15 is a third information storage. The type of data held in the virtual link state database 15 is similar to that of the link state database 11, but the content of data held in the virtual link state database 15 is the second topology information generated by the single point-of-failure detector 14 as described above.

Figure 3:
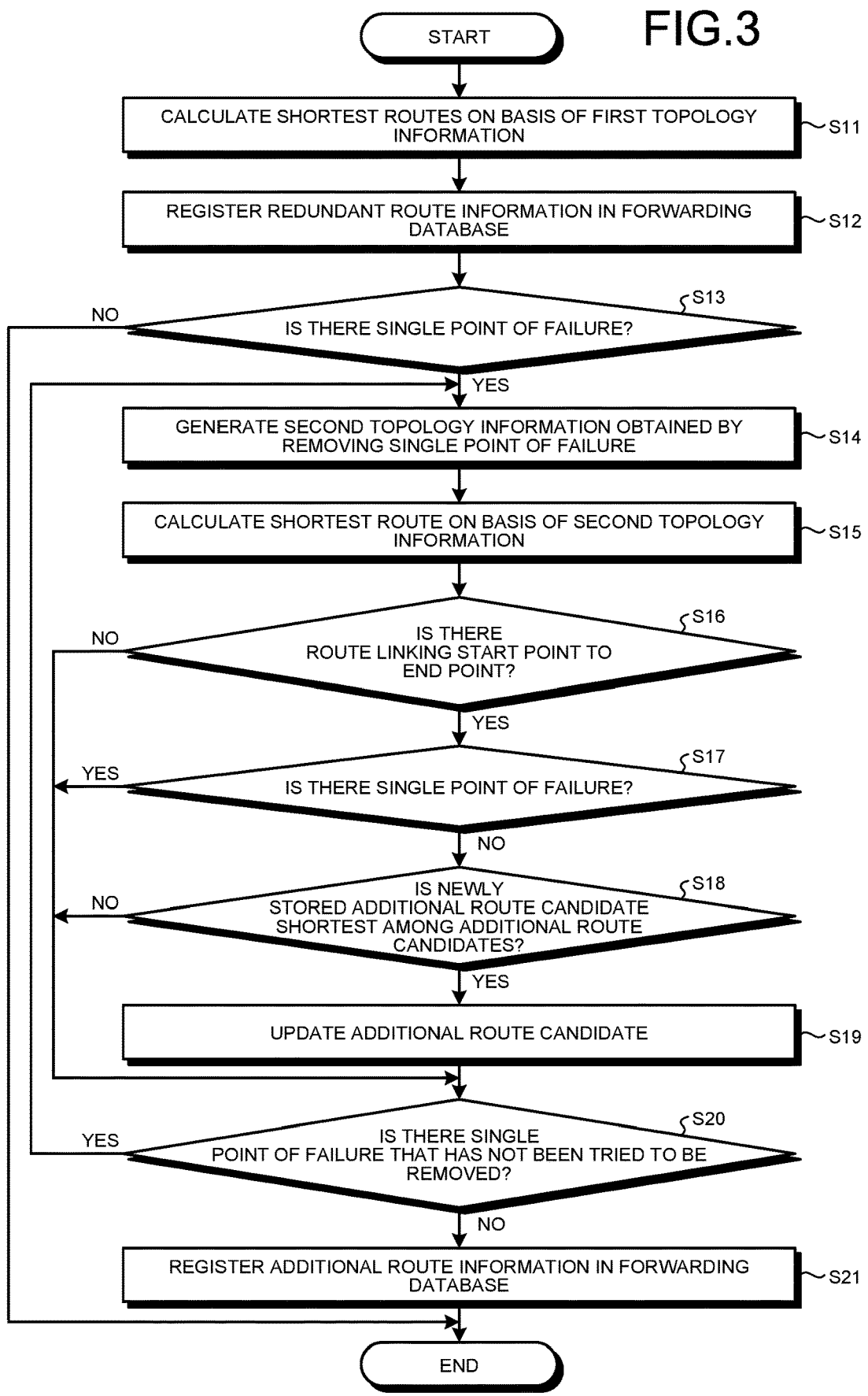
FIG. 3 is a flowchart illustrating an example of the operation of a route calculation process of the transfer device.

Subsequently, an operation of the transfer device 10 for calculating a route that does not form a single point of failure, that is, a route calculation process will be described. FIG. 3 is a flowchart illustrating an example of the operation of the route calculation process of the transfer device 10 according to the present embodiment. The flowchart illustrated in FIG. 3 specifically illustrates an example of the operation until the transfer device 10 registers, in the forwarding database 13, route information that does not form a single point of failure, taking the first topology information held in the link state database 11 into account. In a case where the first topology information held by the link state database 11 is changed due to a change in the configuration of the mesh network, the transfer device 10 executes the operation of the route calculation process in accordance with the flowchart illustrated in FIG. 3 when a predetermined condition is satisfied such as when receiving an instruction from an external network administrator. Note that the transfer device 10 performs the process of the flowchart illustrated in FIG. 3 for each of all combinations of pairs of the plurality of transfer devices 10 constituting the mesh network 30.

First, in the transfer device 10, on the basis of the first topology information held in the link state database 11, the redundant route calculator 12 chooses a certain pair of the transfer devices 10 constituting the mesh network as a target and calculates one or more shortest routes between the pair of the transfer devices 10 (step S11). As described earlier, in the case of the combination of the transfer devices 10 adjacent to each other in the mesh network, one shortest route is found. Accordingly, including such a case, the process in step S11 is also regarded as a process in which the redundant route calculator 12 calculates the redundant route. The redundant route calculator 12 registers the redundant route information, which is information on the calculated redundant route, in the forwarding database 13 (step S12). In addition, the redundant route calculator 12 outputs the redundant route information to the single point-of-failure detector 14. Steps S11 and S12 constitute a first calculation step.

Figure 4:
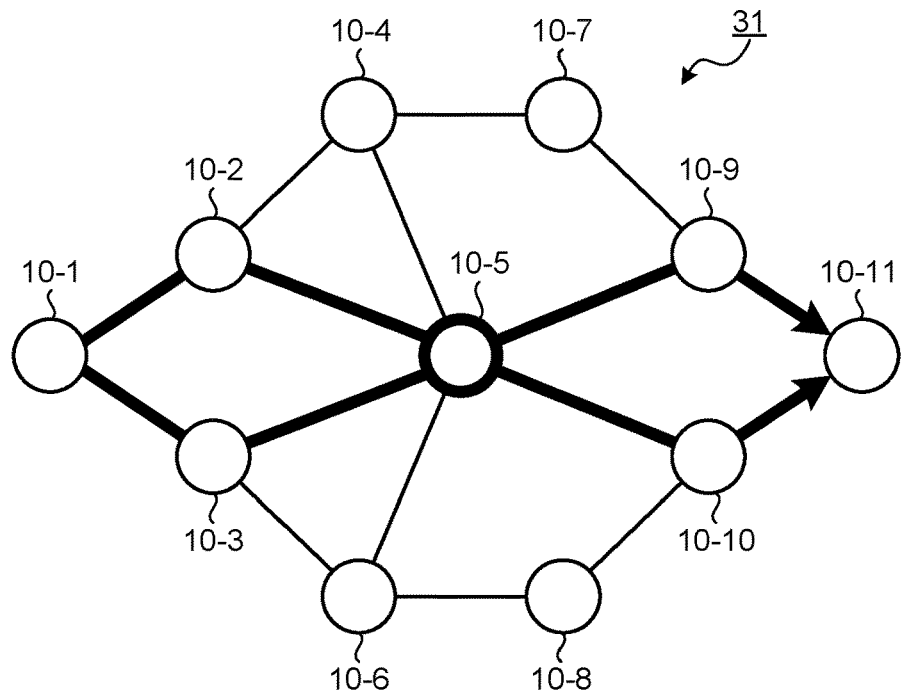
FIG. 4 is a diagram illustrating an example of a mesh network for explaining a process in which a single point-of-failure detector detects a single point of failure.

On the basis of the redundant route information received from the redundant route calculator 12, the single point-of-failure detector 14 determines whether there is a single point of failure on the route between the two transfer devices 10 (step S13). FIG. 4 is a diagram illustrating an example of a mesh network 31 for explaining a process in which the single point-of-failure detector 14 according to the present embodiment detects a single point of failure. The mesh network 31 is constituted by transfer devices 10-1 to 10-11. For example, when the shortest route from the transfer device 10-1 to the transfer device 10-11 is calculated by the SPB, the single point-of-failure detector 14 detects the transfer device 10-5 as a single point of failure. Note that, in the example in FIG. 4, the transfer device 10-1 serves as the first transfer device and the transfer device 10-11 serves as the second transfer device.

Specifically, in the mesh network 31 illustrated in FIG. 4, the following four routes in total are given as the shortest route from the transfer device 10-1 to the transfer device 10-11: a route indicated by "10-1>10-2>10-5>10-9>10-11" leading to the transfer device 10-11 from the transfer device 10-1 by way of the transfer devices 10-2, 10-5, and 10-9 in this order; a route indicated by "10-1>10-2>10-5>10-10>10-11" leading to the transfer device 10-11 from the transfer device 10-1 by way of the transfer devices 10-2, 10-5, and 10-10 in this order; a route indicated by "10-1>10-3>10-5>10-9>10-11" leading to the transfer device 10-11 from the transfer device 10-1 by way of the transfer devices 10-3, 10-5, and 10-9 in this order; and a route indicated by "10-1>10-3>10-5>10-10>10-11" leading to the transfer device 10-11 from the transfer device 10-1 by way of the transfer devices 10-3, 10-5, and 10-10 in this order.

By examining route information obtained by excluding the transfer device 10-1 as the start point and the transfer device 10-11 as the end point from the route information on these four routes, that is, pieces of information "10-2>10-5>10-9", "10-2>10-5>10-10", "10-3>10-5>10-9", and "10-3>10-5>10-10", it can be seen that the transfer device 10 included in all the pieces of route information on the four routes is the transfer device 10-5. The single point-of-failure detector 14 detects the transfer device 10-5 as a single point of failure by the above method.

Figure 5:
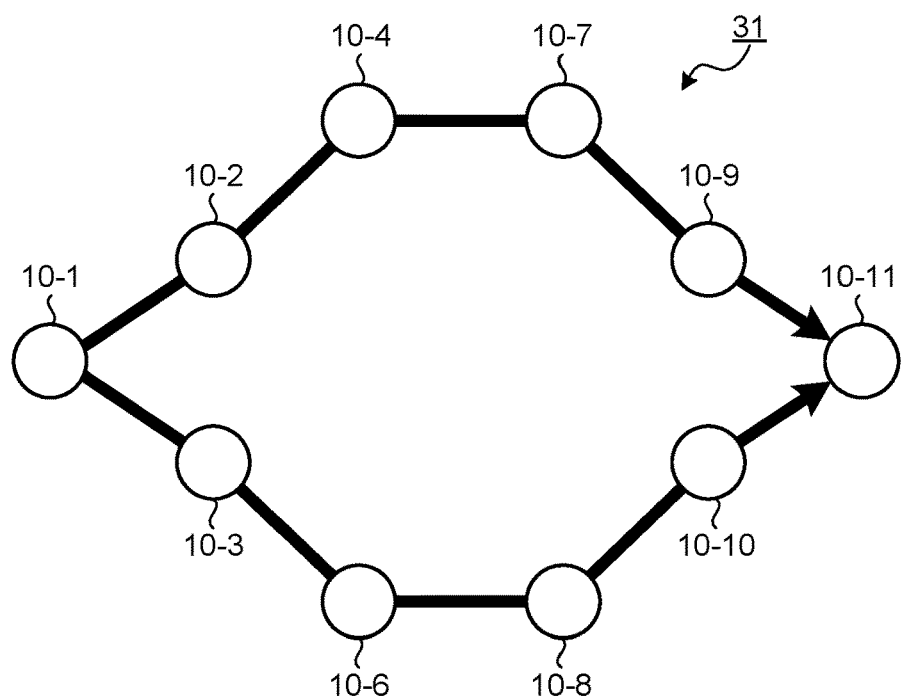
FIG. 5 is a diagram illustrating an example of the mesh network obtained in such a manner that the single point-of-failure detector has detected a single point of failure in the mesh network illustrated in FIG. 4 and the single point of failure has been removed.

When a single point of failure has been detected, that is, when there is a single point of failure (step S13: Yes), the single point-of-failure detector 14 generates the second topology information obtained by removing the single point of failure from the first topology information held in the link state database 11 and registers the generated second topology information in the virtual link state database 15 (step S14). For example, in the mesh network 31 illustrated in FIG. 4, when the single point of failure formed on the shortest route from the transfer device 10-1 to the transfer device 10-11 is removed, the topology illustrated in FIG. 5 is obtained. FIG. 5 is a diagram illustrating an example of the mesh network 31 obtained in such a manner that the single point-of-failure detector 14 according to the present embodiment has detected a single point of failure in the mesh network 31 illustrated in FIG. 4 and the single point of failure has been removed. The second topology information held in the virtual link state database 15 is in a state in which the transfer device 10-5 has been removed from the first topology information held in the link state database 11.

Note that, when a single point of failure has not been detected, that is, there is no single point of failure (step S13: No), the transfer device 10 terminates the process. Steps S13 and S14 constitute a first detection step.

On the basis of the second topology information held in the virtual link state database 15, the redundant route calculator 12 chooses the same pair of transfer devices 10 as in step S11 as a target and calculates the shortest route between the pair of transfer devices 10 (step S15). Furthermore, the redundant route calculator 12 determines whether there is a shortest route, that is, whether there is a route linking the transfer device at the start point to the transfer device at the end point (step S16). This is because there is a case where the mesh network 31 is separated by removing a single point of failure.

When calculating as many shortest routes as possible on the basis of the second topology information obtained by removing the single point of failure formed on the shortest route from the transfer device 10-1 to the transfer device 10-11, that is, the transfer device 10-5 from the mesh network 31 illustrated in FIG. 4, the redundant route calculator 12 calculates two shortest routes indicated by arrows in FIG. 5.

Figure 6:
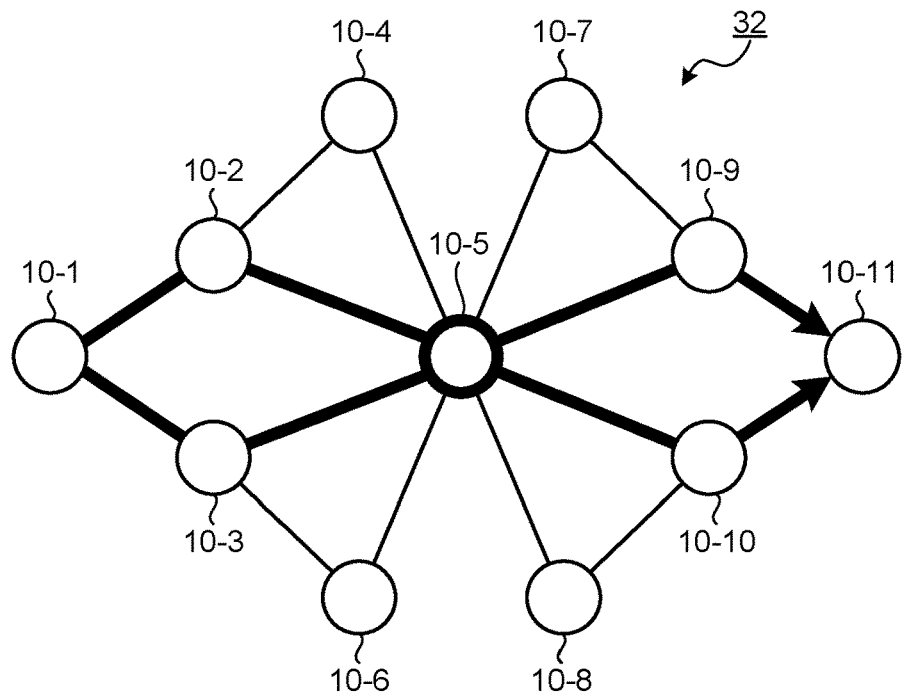
FIG. 6 is a diagram illustrating another example of a mesh network for explaining a process in which the single point-of-failure detector detects a single point of failure.
Figure 7:
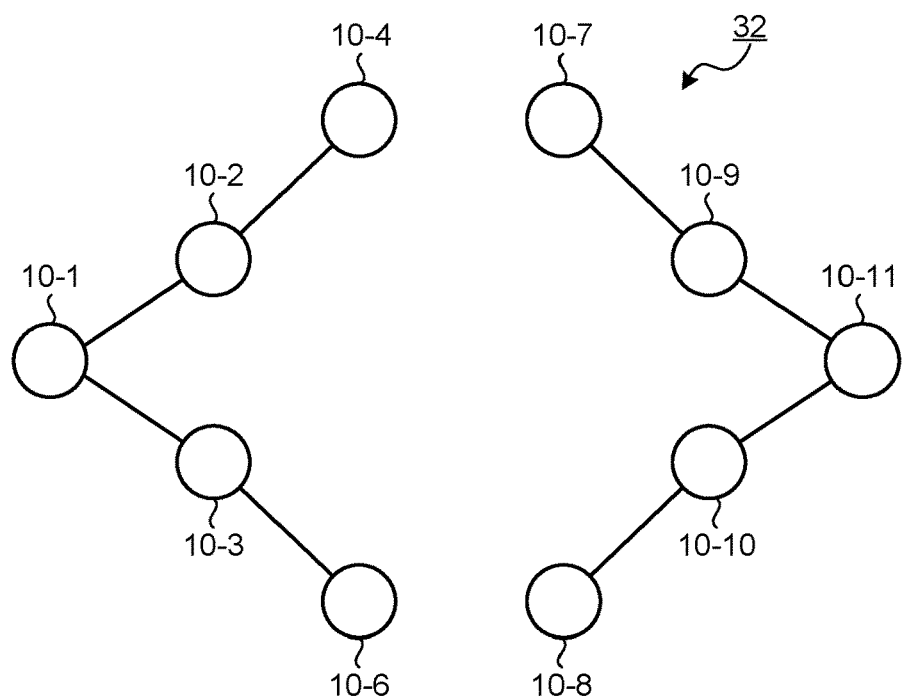
FIG. 7 is a diagram illustrating an example of the mesh network obtained in such a manner that the single point-of-failure detector has detected a single of point failure in the mesh network illustrated in FIG. 6 and the single point of failure has been removed.

FIG. 6 is a diagram illustrating an example of a mesh network 32 for explaining a process in which the single point-of-failure detector 14 according to the present embodiment detects a single point of failure. In addition, FIG. 7 is a diagram illustrating an example of the mesh network 32 obtained in such a manner that the single point-of-failure detector 14 according to the present embodiment has detected a single point of failure in the mesh network 32 illustrated in FIG. 6 and the single point of failure has been removed. The mesh network 32 illustrated in FIG. 6 has the same arrangement of the transfer devices 10 as the arrangement in the mesh network 31 illustrate in FIG. 4, but has different wiring of some communication passages between the transfer devices 10.

In the mesh network 32 illustrated in FIG. 6, the single point of failure on the shortest route from the transfer device 10-1 to the transfer device 10-11 is the transfer device 10-5. When the single point-of-failure detector 14 removes the transfer device 10-5 from the mesh network 32 in step S14, the mesh network 32 is separated as illustrated in FIG. 7. In this case, a route linking the transfer device 10-1 to transfer device 10-11 no longer exists. In consideration of such a case, the redundant route calculator 12 determines in step S16 whether there is a shortest route, that is, there is a route linking the transfer device 10-1 at the start point to the transfer device 10-11 at the end point.

When there is a route linking the transfer device 10-1 at the start point to the transfer device 10-11 at the end point in the calculation of the shortest route (step S16: Yes), the redundant route calculator 12 assigns the calculated shortest route as an additional route candidate that is a candidate to be added to the forwarding database 13, and generates additional route candidate information, which is information on the additional route candidate, to output to the single point-of-failure detector 14. When there is no route linking the transfer device 10-1 at the start point to the transfer device 10-11 at the end point (step S16: No), the redundant route calculator 12 notifies the single point-of-failure detector 14 of the fact that the shortest route could not be calculated. Steps S15 and S16 constitute a second calculation step.

On the basis of the additional route candidate information, the single point-of-failure detector 14 determines whether there is a single point of failure on the route between two transfer devices 10 (step S17). The method of determining whether there is a single point of failure by the single point-of-failure detector 14 in step S17 is similar to the method in the case of step S13. When the single point of failure has not been detected, that is, when there is no single point of failure (step S17: No), the single point-of-failure detector 14 stores an additional route candidate having the shortest route length among the additional route candidates, and the distance of that additional route candidate. The single point-of-failure detector 14 stores the shortest additional route candidate and the distance thereof for each pair of the transfer devices 10 at the start point and the transfer device 10 at the end point. Taking the mesh network 31 illustrated in FIG. 4 as an example, the single point-of-failure detector 14 separately stores information on the shortest additional route candidate from the transfer device 10-1 to the transfer device 10-11 and the distance thereof (hereinafter referred to as information 1) and information on the shortest additional route candidate from the transfer device 10-11 to the transfer device 10-1 and the distance thereof (hereinafter referred to as information 2). The single point-of-failure detector 14 does not compare the information 1 with the information 2.

The single point-of-failure detector 14 compares the distance of the newly stored additional route candidate with the distance of the stored additional route candidate. When the distance of the newly stored additional route candidate is shorter than the distance of the stored additional route candidate, that is, when the newly stored additional route candidate is the shortest among the additional route candidates (step S18: Yes), the single point-of-failure detector 14 stores the newly stored additional route candidate as the latest additional route candidate and updates the additional route candidate (step S19). Note that the single point-of-failure detector 14 may carry out step S19 by skipping step S18 when there is no stored additional route candidate, that is, at the time of the initial operation.

When receiving a notification from the redundant route calculator 12 indicating that there is no route linking the transfer device 10-1 at the start point to the transfer device 10-11 at f the end point (step S16: No), when a single point of failure has been detected, that is, when there is a single point of failure (step S17: Yes), when the distance of the stored additional route candidate the distance of the newly stored additional route candidate is established, that is, when the newly stored additional route candidate is not the shortest among the additional route candidates (step S18: No), and after the process in step S19, the single point-of-failure detector 14 determines whether there is a single point of failure that has not been tried to be removed in step S14 in the previous processes (step S20). This is because there is a case where a plurality of single points of failure exists on one route.

When there is a single point of failure that has not yet been tried to be removed (step S20: Yes), the single point-of-failure detector 14 returns to step S14 and generates the second topology information obtained by removing the single point of failure that has not yet been tried to be removed, from the first topology information in the link state database 11 in step S14. The subsequent processes are as described above. In this manner, the single point-of-failure detector 14 decides the additional route on the basis of the additional route candidate information and generates the additional route information to register in the forwarding database 13.

Furthermore, the single point-of-failure detector 14 decides the transfer device 10 or the communication passage between the transfer devices 10 included in all the shortest routes in the redundant route information as the single point of failure, and generates the second topology information obtained by removing one of the decided single points of failure from the first topology information. When there is a plurality of single points of failure, the single point-of-failure detector 14 generates the second topology information by changing the single point of failure to be removed.

When all the single points of failure have been tried to be removed (step S20: No), the single point-of-failure detector 14 generates the additional route information with the additional route candidate stored by the process in step S19 as an additional route, and registers the additional route information in the forwarding database 13 (step S21). When there is a plurality of additional route candidates linking the transfer device 10 at the start point to the transfer device 10 at the end point, on which a single point of failure has not been detected, the single point-of-failure detector 14 decides an additional route candidate having the shortest route length among the plurality of additional route candidates, as the additional route and generates the additional route information. Steps S17 to S21 constitute a second detection step.

Note that, in the transfer device 10, the processes from step S13 to step S20 may be carried out for a specific route designated by an administrator of the mesh network 31 illustrated in FIG. 4, for example, the route from the transfer device 10-1 to the transfer device 10-11, or may be carried out for routes between all the transfer devices 10 constituting the mesh network 31.

Figure 8:
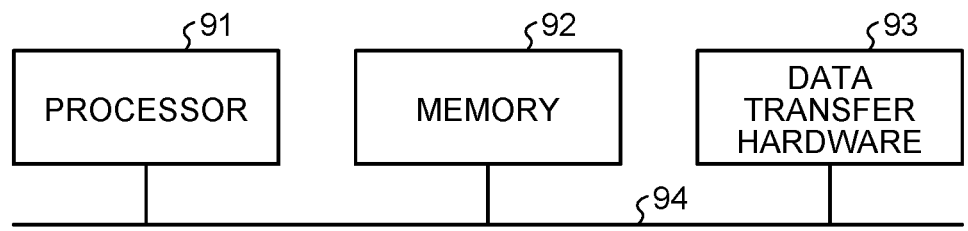
FIG. 8 is a diagram illustrating a hardware configuration example of the transfer device.

Subsequently, hardware that implements the transfer device 10 will be described. FIG. 8 is a diagram illustrating a hardware configuration example of the transfer device 10 according to the present embodiment. The transfer device 10 can be implemented by a processor 91, a memory 92 and data transfer hardware 93 illustrated in FIG. 8. The processor 91, the memory 92, and the data transfer hardware 93 mentioned above are connected via a bus 94.

The processor 91 is a central processing unit (also referred to as CPU, processing unit, arithmetic unit, processor, microprocessor, microcomputer, or digital signal processor (DSP)), a system large scale integration (LSI), or the like. The memory 92 is a nonvolatile or volatile semiconductor memory such as a random access memory (RAM), a read only memory (ROM), a flash memory, an erasable programmable read only memory (EPROM), an electrically erasable programmable read only memory (EEPROM), a magnetic disk, a flexible disk, an optical disc, a compact disk, a mini disk, a digital versatile disc (DVD), or the like.

The link state database 11, the forwarding database 13, and the virtual link state database 15 of the transfer device 10 are implemented by the memory 92. The redundant route calculator 12 and the single point-of-failure detector 14 of the transfer device 10 are implemented by software, firmware, or a combination of software and firmware. The software and the firmware are described as programs and stored in the memory 92. The redundant route calculator 12 and the single point-of-failure detector 14 are implemented by the processor 91 reading out programs for working as each of the redundant route calculator 12 and the single point-of-failure detector 14 from the memory 92 and executing the read-out programs. That is, the transfer device 10 includes the memory 92 for storing retaining a program that will eventually execute the steps for carrying out the actions of the redundant route calculator 12 and the single point-of-failure detector 14 when the function of the transfer device 10 is executed by the processor 91. It can also be said that these programs are programs for causing a computer to execute various processes performed by the redundant route calculator 12 and the single point-of-failure detector 14.

Figure 9:
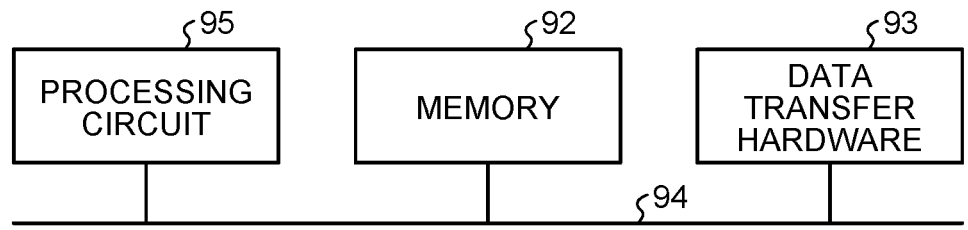
FIG. 9 is a diagram illustrating another hardware configuration example of the transfer device.

The redundant route calculator 12 and the single point-of-failure detector 14 may be implemented by dedicated hardware. FIG. 9 is a diagram illustrating another hardware configuration example of the transfer device 10 according to the present embodiment. The redundant route calculator 12 and the single point-of-failure detector 14 are implemented by a processing circuit 95 as dedicated hardware. As dedicated hardware, a single circuit, a composite circuit, a programmed processor, a parallel programmed processor, an application specific integrated circuit (ASIC), a field programmable gate array (FPGA), or a combination thereof are applicable. One of the redundant route calculator 12 and the single point-of-failure detector 14 may be implemented by dedicated hardware and the rest may be implemented by the processor 91 and the memory 92 described above.

The data transfer hardware 93 is used when the transfer device 10 receives data from another transfer device 10 or the terminal device 20 and when the received data is transferred to another transfer device 10 or the terminal device 20. The data transfer hardware 93 is also used when information to be stored in the link state database 11 is received from the outside.

As described thus far, according to the present embodiment, when a single point of failure has been detected in a mesh network made up of the plurality of transfer devices 10, the transfer device 10 decides the additional route on the basis of the second topology information obtained by removing the single point of failure from the first topology information on the mesh network, and stores the decided additional route together with information on the redundant route obtained from the first topology information. With this configuration, the transfer device 10 can store information on a route not including a single point of failure and can improve the reliability of communication in the mesh network.

The configuration illustrated in the above embodiment indicates one example of the content of the present invention and can be combined with another known technology. A part of the configuration can also be omitted and modified without departing from the gist of the present invention.

REFERENCE SIGNS LIST

10, 10-1 to 10-11 transfer device; 11 link state database; 12 redundant route calculator; 121 shortest route calculator; 122 tie breaker; 13 forwarding database; 14 single point-of-failure detector; 15 virtual link state database; 20-1 to 20-7 terminal device; 30, 31, mesh network.

The invention claimed is:

1. A transfer device comprising: a memory; and a processor and/or processing circuitry configured to
    calculate, on the basis of first topology information that is topology information on a network made up of a plurality of transfer devices, one or more shortest routes from a first transfer device to a second transfer device among the plurality of transfer devices, and generate redundant route information that is information on the one or more shortest routes;
    store the generated redundant route information; and
    identify a potential single point of failure on the basis of the generated redundant route information and generate second topology information that is topology information obtained by removing the potential single point of failure from the first topology information, wherein
    on the basis of the second topology information, the processor and/or processing circuitry calculates a candidate of an additional route to be added as a route from the first transfer device to the second transfer device, and generates additional route candidate information that is information on the candidate of the additional route, and
    the processor and/or processing circuitry decides the additional route on the basis of the additional route candidate information, and generates additional route information that is information on the additional route, to register the generated additional route information in the information storage, when there is a plurality of additional route candidates on which a single point of failure has not been detected, the processor and/or processing circuitry generates the additional route information with an additional route candidate having the shortest route length among the plurality of additional route candidates, as the additional route.

2. The transfer device according to claim 1, wherein the processor and/or processing circuitry decides a transfer device or a communication passage between the transfer devices included in all the shortest routes in the redundant route information as the single point of failure, and generates the second topology information obtained by removing one of the decided single points of failure from the first topology information.

3. The transfer device according to claim 2, wherein when there is a plurality of the single points of failure, the processor and/or processing circuitry generates the second topology information by changing the single point of failure to be removed.

4. The transfer device according to claim 1,
the processor and/or processing circuitry decides a transfer device or a communication passage between the transfer devices included in all the shortest routes in the redundant route information as the single point of failure, and generates the second topology information obtained by removing one of the decided single points of failure from the first topology information,
when there is a plurality of additional route candidates on which a single point of failure has not been detected, the processor and/or processing circuitry generates the additional route information with an additional route candidate having the shortest route length among the plurality of additional route candidates, as the additional route.

5. A route addition method comprising:
a first calculation step in which, on the basis of first topology information that is topology information on a network made up of a plurality of transfer devices, a redundant route calculator calculates a plurality of shortest routes from a first transfer device to a second transfer device among the plurality of transfer devices, and generates redundant route information that is information on the plurality of shortest routes, to register the generated redundant route information in an information storage;
a first detection step in which a single point-of-failure detector identifies a potential single point of failure on the basis of the redundant route information and generates second topology information that is topology information obtained by removing the single point of failure from the first topology information;
a second calculation step in which, on the basis of the second topology information, the redundant route calculator calculates a candidate of an additional route to be added as a route from the first transfer device to the second transfer device, and generates additional route candidate information that is information on the candidate of the additional route; and
a second detection step in which the single point-of-failure detector decides the additional route on the basis of the additional route candidate information, and generates additional route information that is information on the additional route, to register the generated additional route information in the information storage,
when there is a plurality of additional route candidates on which a single point of failure has not been detected, the processor and/or processing circuitry generates the additional route information with an additional route candidate having the shortest route length among the plurality of additional route candidates, as the additional route.

6. The transfer device according to claim 1, wherein the single point of failure indicates a location of the network where if a failure occurs in one of the plurality of transfer devices or one link included in the network, a failure occurs in all the shortest routes and a communication failure is caused between the first transfer device and the second transfer device.

7. The route addition method according to claim 5, wherein the single point of failure indicates a location of the network where if a failure occurs in one of the plurality of transfer devices or one link included in the network, a failure occurs in all the shortest routes and a communication failure is caused between the first transfer device and the second transfer device.

8. Processing circuitry configured to
calculate, on the basis of first topology information that is topology information on a network made up of a plurality of transfer devices, one or more shortest routes from a first transfer device to a second transfer device among the plurality of transfer devices, and generate redundant route information that is information on the one or more shortest routes;
store the generated redundant route information in a memory; and
identify a potential single point of failure on the basis of the redundant route information and generate second topology information that is topology information obtained by removing the potential single point of failure from the first topology information,
wherein on the basis of the second topology information, the processing circuitry calculates a candidate of an additional route to be added as a route from the first transfer device to the second transfer device, and generates additional route candidate information that is information on the candidate of the additional route, and
decides the additional route on the basis of the additional route candidate information, and generates additional route information that is information on the additional route, to register the generated additional route information in the memory,
when there is a plurality of additional route candidates on which a single point of failure has not been detected, the processor and/or processing circuitry generates the additional route information with an additional route candidate having the shortest route length among the plurality of additional route candidates, as the additional route.

9. A non-transitory computer readable medium that stores a program for causing a processor to execute processes of:
on the basis of first topology information that is topology information on a network made up of a plurality of transfer devices, calculating one or more shortest routes from a first transfer device to a second transfer device among the plurality of transfer devices, and generating redundant route information that is information on the one or more shortest routes;
storing the redundant route information in a memory; and
identifying a potential single point of failure on the basis of the redundant route information and generating second topology information that is topology information obtained by removing the potential single point of failure from the first topology information, wherein on the basis of the second topology information, calculating a candidate of an additional route to be added as a route from the first transfer device to the second transfer device, and generates additional route candidate information that is information on the candidate of the additional route, and deciding the additional route on the basis of the additional route candidate information, and generates additional route information that is information on the additional route, to register the generated additional route information in the memory, when there is a plurality of additional route candidates on which a single point of failure has not been detected, the processor and/or processing circuitry generates the additional route information with an additional route candidate having the shortest route length among the plurality of additional route candidates, as the additional route.

* * * * *